United States Patent
Bauer et al.

(10) Patent No.: US 8,291,931 B2
(45) Date of Patent: Oct. 23, 2012

(54) FLOW CONTROL VALVE

(75) Inventors: Wolfgang Bauer, Riegelsberg (DE); Bettina Rudy, Kleinbundenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 767 days.

(21) Appl. No.: 12/294,637

(22) PCT Filed: Mar. 26, 2007

(86) PCT No.: PCT/EP2007/052849
§ 371 (c)(1),
(2), (4) Date: Oct. 31, 2008

(87) PCT Pub. No.: WO2007/113151
PCT Pub. Date: Oct. 11, 2007

(65) Prior Publication Data
US 2010/0163122 A1  Jul. 1, 2010

(30) Foreign Application Priority Data
Mar. 29, 2006 (DE) .......................... 10 2006 014 446

(51) Int. Cl.
*F16K 31/12* (2006.01)
*F16K 31/36* (2006.01)
(52) U.S. Cl. ..................................... 137/504; 137/454.5
(58) Field of Classification Search .................. 137/504, 137/500, 495, 315.41, 494, 454.5
See application file for complete search history.

(56) References Cited

U.S. PATENT DOCUMENTS

| | | | |
|---|---|---|---|
| 2,496,577 A | 2/1950 | Cahill | |
| 3,145,730 A * | 8/1964 | Presnell | 137/493.2 |
| 4,237,922 A * | 12/1980 | Maier | 137/493 |
| 4,570,667 A | 2/1986 | Masica | |
| 4,700,733 A * | 10/1987 | Uchino et al. | 137/504 |
| 4,955,461 A | 9/1990 | Keir | |
| 4,978,233 A * | 12/1990 | Stotzel et al. | 384/12 |
| 5,180,443 A * | 1/1993 | Voss | 137/494 |
| 5,996,615 A * | 12/1999 | Zuegner et al. | 137/493 |
| 6,142,171 A * | 11/2000 | Hancock | 137/271 |
| 7,063,100 B2 * | 6/2006 | Liberfarb | 137/115.08 |
| 2004/0042689 A1* | 3/2004 | Wasson et al. | 384/12 |

FOREIGN PATENT DOCUMENTS

| | | |
|---|---|---|
| AT | 2 54 657 Y | 6/1967 |
| DE | 70 39 179 X | 4/1971 |
| DE | 24 32 823 X | 1/1976 |
| DE | 34 25 164 XY | 1/1986 |
| DE | 39 17 673 Y | 6/1990 |
| DE | 195 39 521 X | 4/1997 |
| DE | 197 49 639 Y | 5/1999 |
| DE | 103 04 560 Y | 8/2004 |
| DE | 10 2004 040155 Y | 2/2006 |
| EP | 1 353 254 Y | 10/2003 |
| JP | 54108572 U | 7/1979 |

* cited by examiner

*Primary Examiner* — John Rivell
*Assistant Examiner* — Seth Faulb
(74) *Attorney, Agent, or Firm* — Lucas & Mercanti, LLP; Klaus P. Stoffel

(57) ABSTRACT

A flow control valve (11) for a hydraulic line, having an outlet opening (18a) for hydraulic fluid, an inlet opening (18) for hydraulic fluid and a differential pressure regulator (17) for the pressure independent provision of a constant volumetric flow of the hydraulic fluid, and having a setting part (15a) for setting the control behavior of the differential pressure regulator (17), the setting part (15a) having an operating section (27) which is provided so as to be accessible outside the hydraulic line for setting the setting part (15a).

11 Claims, 4 Drawing Sheets

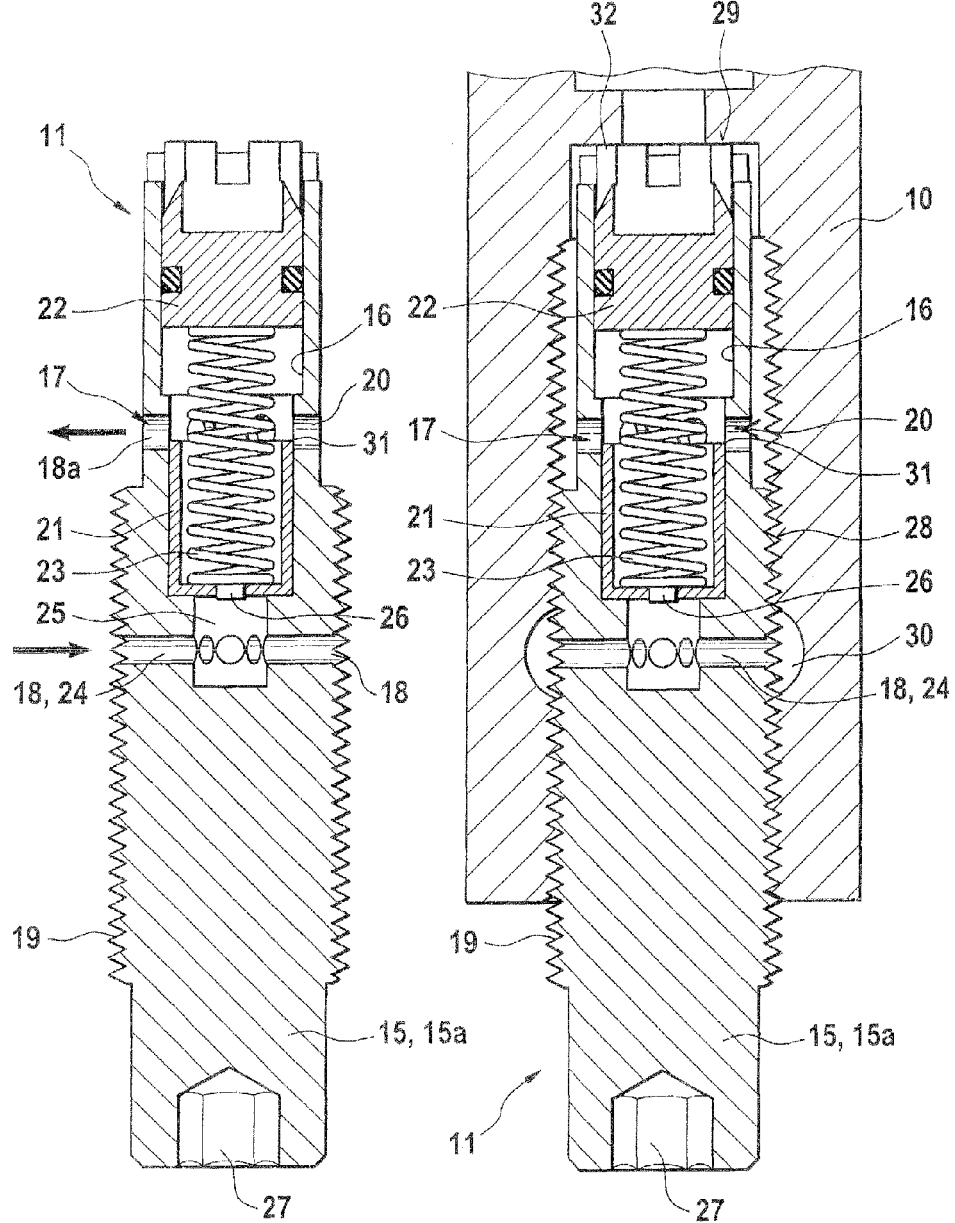

FLOW CONTROL VALVE

This application is a 371 of PCT/EP2007/052849 filed Mar. 26, 2007, which in turn claims the priority of DE 10 2006 014 446.5 filed Mar. 29, 2006, the priority of both applications is hereby claimed and both applications are incorporated by reference herein.

BACKGROUND OF THE INVENTION

The present invention relates to a flow control valve for a hydraulic line.

Flow control valves which are connected to hydraulic lines control the throughflow of hydraulic fluid through the hydraulic line, the control behavior of the flow control valve being more or less independent of the viscosity of the hydraulic fluid and of the prevailing pressure at the inlet of the pressure control valve. The invention also relates to hydraulic systems, in which flow control valves of this type are arranged. The present invention relates, in particular, to hydrostatic profiled rail guides, in which flow control valves of this type are used.

The company Hydac International markets 2-way flow control valves according to DIN ISO 1219 for oil hydraulic systems, which 2-way flow control valves keep the emerging volumetric flow constant by a control operation. The volumetric flow is largely independent of the pressure and of the viscosity. The magnitude of the volumetric flow is defined by a fixed diaphragm (measuring diaphragm) and can be adjusted in a defined range. Said flow control valves are installed in oil hydraulic systems and are no longer accessible from the outside in the installed state. Unauthorized adjustment is accordingly not possible. Said flow control valves are distinguished by a compact design and space-saving installation in connecting housings, control blocks and, in particular, in the case of constricted installation conditions.

Flow control valves of this type are fixed diaphragm valves with differential pressure regulators which are connected downstream of them for oil hydraulic systems. The differential pressure regulator comprises substantially a control piston, a compression spring, a control diaphragm and the setting part, in particular the setting screw for setting the control pressure difference. The measuring diaphragm defines the volumetric flow setting range. A flow through the flow control valve from the inlet opening to the outlet opening brings about a pressure gradient at the measuring diaphragm. The differential pressure regulator moves into a control position which corresponds to the force equilibrium from the action of force of the pressure gradient across the measuring diaphragm multiplied by the control piston surface area on one side and the compression spring force on the other. As the throughflow rises, that is to say as the pressure gradient increases, the cross section of the control diaphragm is reduced in accordance with the increased pressure gradient until there is a force equilibrium again. A constant volumetric flow on the path of the hydraulic fluid from the inlet opening to the outlet opening is ensured by the continuous readjustment of the differential pressure regulator as a function of the prevailing pressure gradient. Flow can pass through the valve uncontrolled in the opposite direction.

If flow control valves of this type are used, for example, in hydrostatic profiled rail guides, in which a guide carriage is mounted hydrostatically on a guide rail, pressure pockets between the guide rail and the guide carriage are loaded with hydraulic fluid. Depending on the loading of the guide carriage, it can be required to adapt the control behavior of the differential pressure regulator. In the case of the known flow control valves which are described in the introduction, that would have the consequence in a profiled rail guide that said profiled rail guide first of all has to be decommissioned, the guide carriage then has to be opened to such an extent that there is access to the flow control valve, in order finally to set the setting screw for changing the control behavior of the differential pressure regulator to the given loading of the guide carriage. Following this setting work, the guide carriage has to be reassembled and the hydrostatic profiled rail guide has to be recommissioned. This procedure is complicated and, depending on the application of profiled rail guides of this type, can have the consequence of a temporary production downtime.

SUMMARY OF THE INVENTION

It is an object of the present invention to specify a flow control valve according to the features of the preamble of claim 1, in which flow control valve the control behavior of the differential pressure regulator can be adapted in a simple way to given requirements.

According to the invention, this object is achieved by the fact that the setting part has an operating section which is provided so as to be accessible outside the hydraulic line for setting the setting part. Differently than in the case of the known flow control valves, the flow control valve according to the invention provides this operating section which can have, for example, a standardized tool receptacle. For example, a Torx attachment or a hexagon socket or a hexagon insert bit is conceivable, in order for it to be possible to act on this operating section with commercially available tools. Opening an oil hydraulic system, for example a hydrostatic profile rail guide, is dispensed with. The setting part can be used for setting the control behavior of the differential pressure regulator on the operating section without complicated additional work.

The setting part is preferably configured as a housing, in which the differential pressure regulator is accommodated. The housing can be, for example, of tubular configuration and can be provided with an external thread on its outer circumference. The setting part can then be screwed with its external thread into a housing hole which is provided on the system side. The screwed depth of this housing into the threaded hole of the connecting component then defines the control behavior of the differential pressure regulator. That means that it can be sufficient on the part of the oil hydraulic system to provide a housing hole on a connecting component, said threaded hole being provided firstly for receiving the flow control valve and at the same time for setting the control behavior of the differential pressure regulator. The setting part extends from the guide carriage so as to externally indicate a position of the setting part.

In a known way, the differential pressure regulator can have a control mechanism which has a control piston which is arranged such that it can be moved with respect to the setting part and which delimits an adjustable flow cross section together with an opening which is provided on the setting part for controlled throughflow with hydraulic fluid.

Said differential pressure regulator can be accommodated without problems longitudinally displaceably in a housing hole of the setting part which is configured as a housing, the control piston delimiting with a control edge, together with at least one opening which penetrates the housing, an adjustable flow cross section for controlled throughflow with hydraulic fluid.

The differential pressure regulator preferably has a supporting piston, a spring acting at one end on the supporting piston and at the other end on the control piston. A supporting spacing for the spring can preferably be set between the supporting piston and the control piston. In a differential pressure regulator which is developed in this way, the control behavior can be set in a simple way by the fact that the supporting spacing can be produced by screwing in the housing with respect to the supporting piston which is supported in a fixed manner on the frame. A stop can then be provided on the system side for the supporting piston, with the result that, in order to set the control behavior, a relative displacement between the supporting piston and the housing with the control piston which is supported on it can be performed by screwing the housing into the housing hole.

The threaded hole which is provided on the hydraulic system for receiving flow control valves according to the invention can have a part which delimits the threaded hole and is provided for bearing against the above-described supporting piston of the differential pressure regulator.

The setting part which is configured as a housing can advantageously be provided, at its accessible end which faces away from the threaded hole, with an operating section for a tool to act on.

Flow control valves according to the invention are particularly suitable for use in hydrostatic profiled rail guides, since, in the case of changing loadings of the hydrostatic profiled rail guide, the control behavior of the differential pressure regulator can be adapted to the given loadings of the profiled rail guide by simple adjustment on the operating section of the setting part.

BRIEF DESCRIPTION OF THE DRAWINGS

In the following text, the invention will be explained in greater detail using two exemplary embodiments which are depicted in a total of six figures, in which:

FIG. 5 shows a flow control valve according to the invention in longitudinal section, and FIG. 6 shows the flow control valve from FIG. 5, screwed into the profiled rail guide.

DETAILED DESCRIPTION OF THE INVENTION

Figure 1:
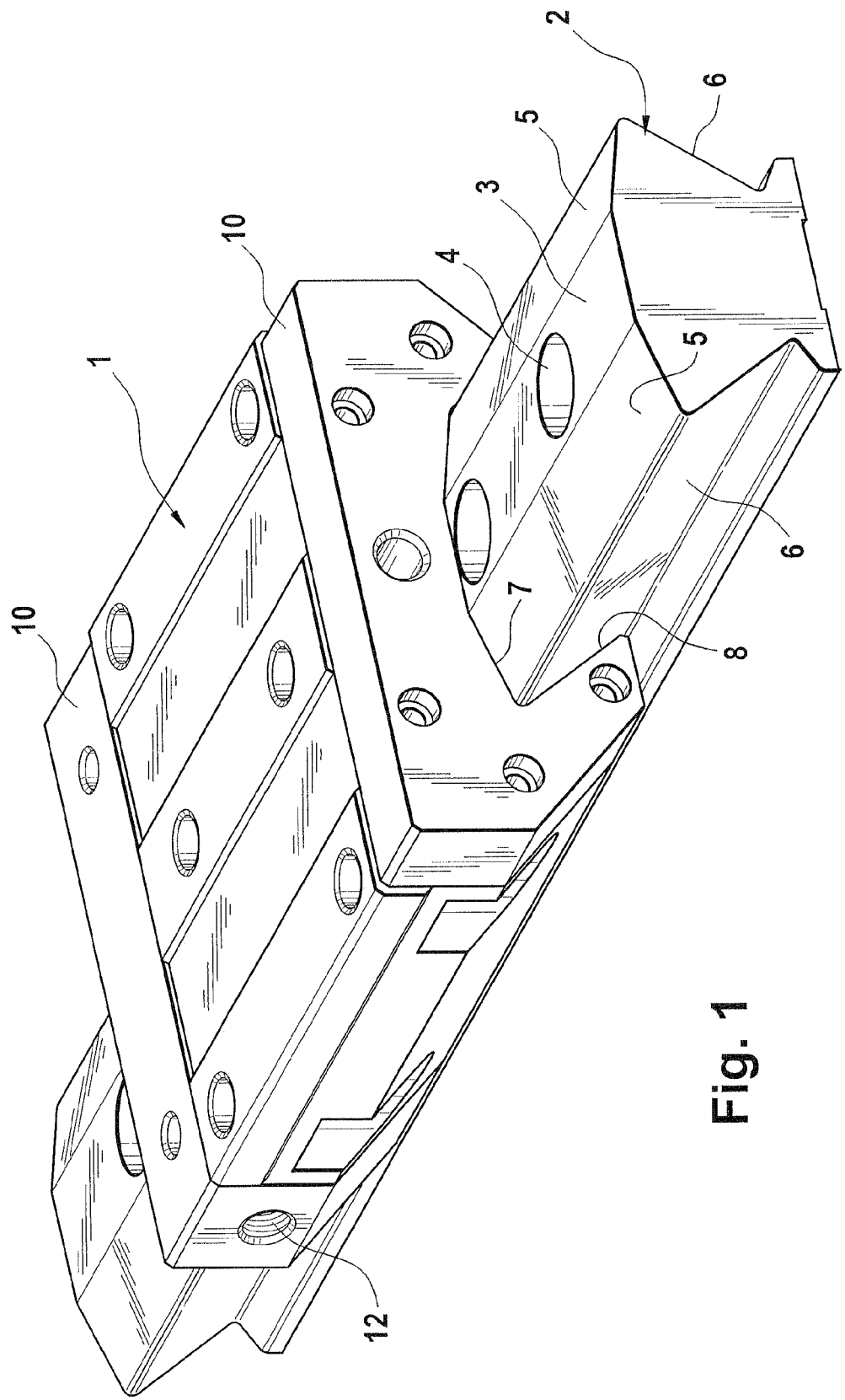
FIG. 1 shows a perspective illustration of a hydrostatic profiled rail guide.

The profiled rail guide according to the invention which is depicted in FIGS. 1 to 4 comprises a guide carriage 1 which is mounted hydrostatically on a guide rail 2. The guide rail 2 has a head section which faces the guide carriage 1 and a foot section which faces a machine part (not depicted), on which the guide rail 2 is fastened. At its head section, the guide rail 2 is provided with a center face 3 along the longitudinal axis of the profiled rail guide. The guide rail 2 is provided with a multiplicity of through openings 4 which are arranged along the guide rail and through which fastening screws (not depicted here) are provided for fastening the guide rail to the machine part which is mentioned further above. Said through holes 4 penetrate the center face 3 of the guide rail 2.

At its head section, the guide rail 2 is provided with two upper bearing faces 5 and two lower bearing faces 6. The upper bearing faces 5 are of planar configuration; they are arranged such that they are inclined with respect to the center axis 3, one upper bearing face 5 being arranged on one side of the center face 3 and the other upper bearing face 5 being arranged on the other longitudinal side of the center face 3. The lower bearing faces 6 are arranged below the upper bearing faces 5. These lower bearing faces 6 are arranged such that they are inclined both with respect to the center face 3 and also with respect to the upper bearing faces 5.

The guide carriage is provided with further upper and lower bearing faces 7, 8, the upper and lower bearing faces 5, 6, 7, 8 of the guide carriage and the guide rail being assigned to one another. These bearing faces are indicated in FIG. 2.

Figure 2:
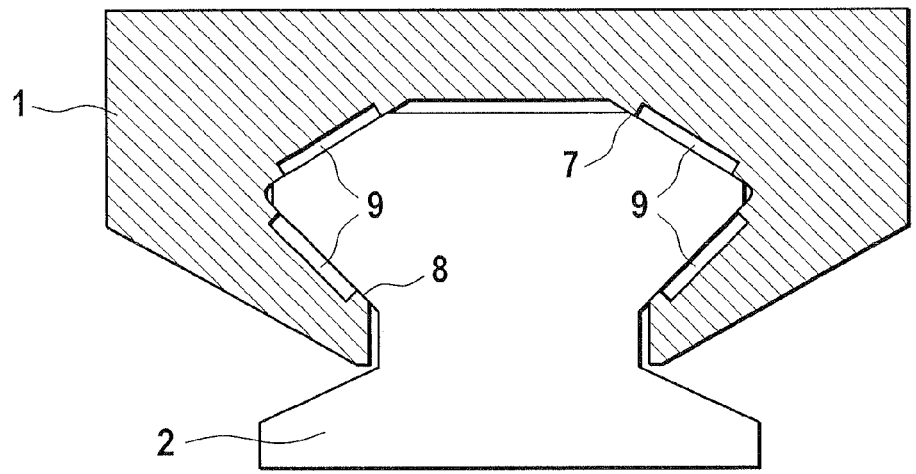
FIG. 2 shows the hydrostatic profiled rail guide in cross section, in a diagrammatic illustration.

Furthermore, it can be gathered from FIG. 2 that a total of four pressure pockets 9 for the upper and lower bearing faces 5, 6 are formed on the guide carriage 1, which pressure pockets 9 can be loaded with hydraulic fluid. A constant lubricating film can be built up between the bearing faces 5, 6, 7, 8 during operation of the hydrostatic profiled rail guide.

Figure 4:
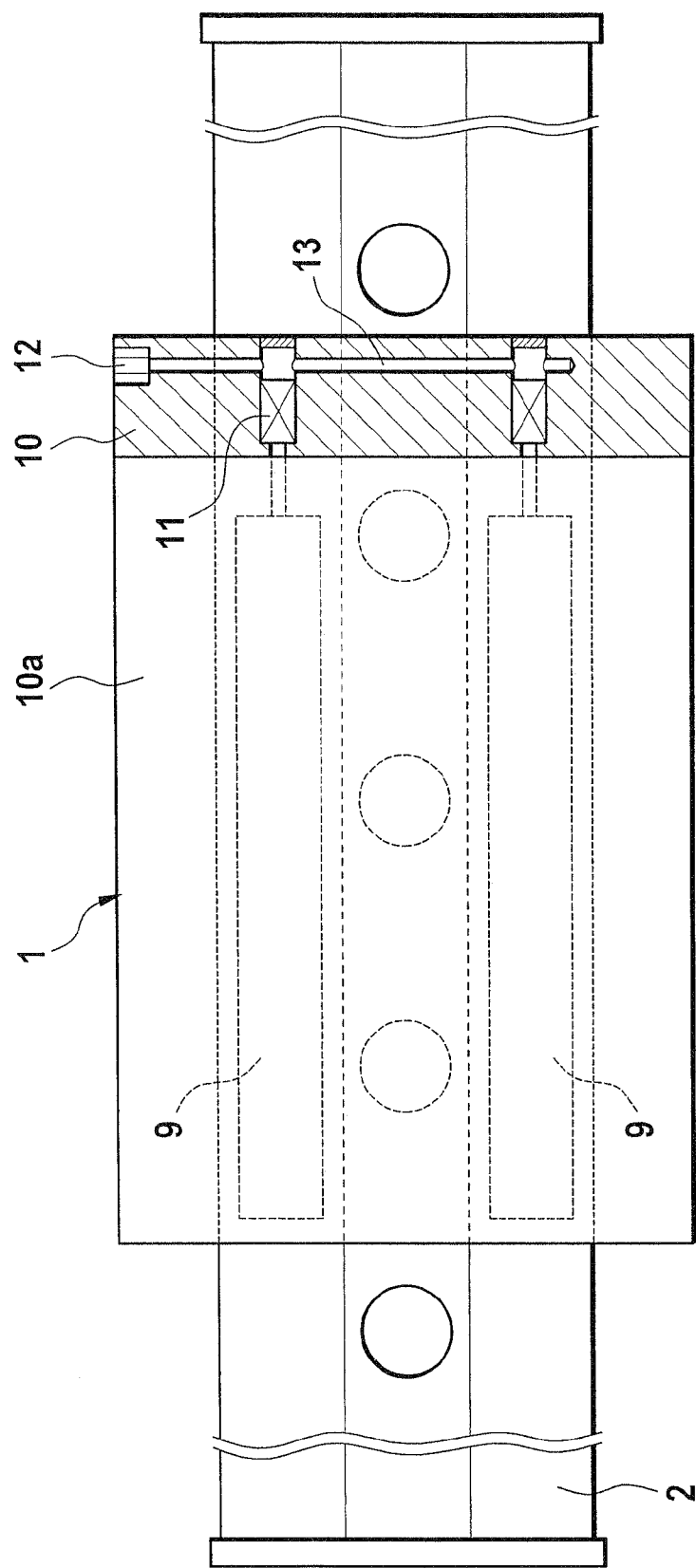
FIG. 4 shows a plan view of the hydrostatic profiled rail guide according to the invention.

FIG. 4 diagrammatically shows two of said pressure pockets 9 in a plan view of the hydrostatic profiled rail guide according to the invention. It can be gathered from this diagrammatic illustration that the guide carriage 1 has a carrying element 10a and a head piece 10 which is fastened to the end of the latter. The head piece 10 is provided with a plurality of flow control valves 11. Said flow control valves 11 are integrated into the head piece. One flow control valve is provided for each pressure pocket 9. The flow control valves 11 are connected in parallel. They open into a common collective connection 12 which is arranged on one side of the head piece 12. Furthermore, feed channels 13 are integrated into said head piece 10, which feed channels 13 are connected firstly to all the flow control valves 11 and secondly to the common collective connection 12. An oil pump, for example, can be connected to said collective connection 12 via a pressure hose.

FIG. 1 also shows the head piece 10 which is shown only diagrammatically in FIG. 4, with the collective connection 12.

Figure 3:
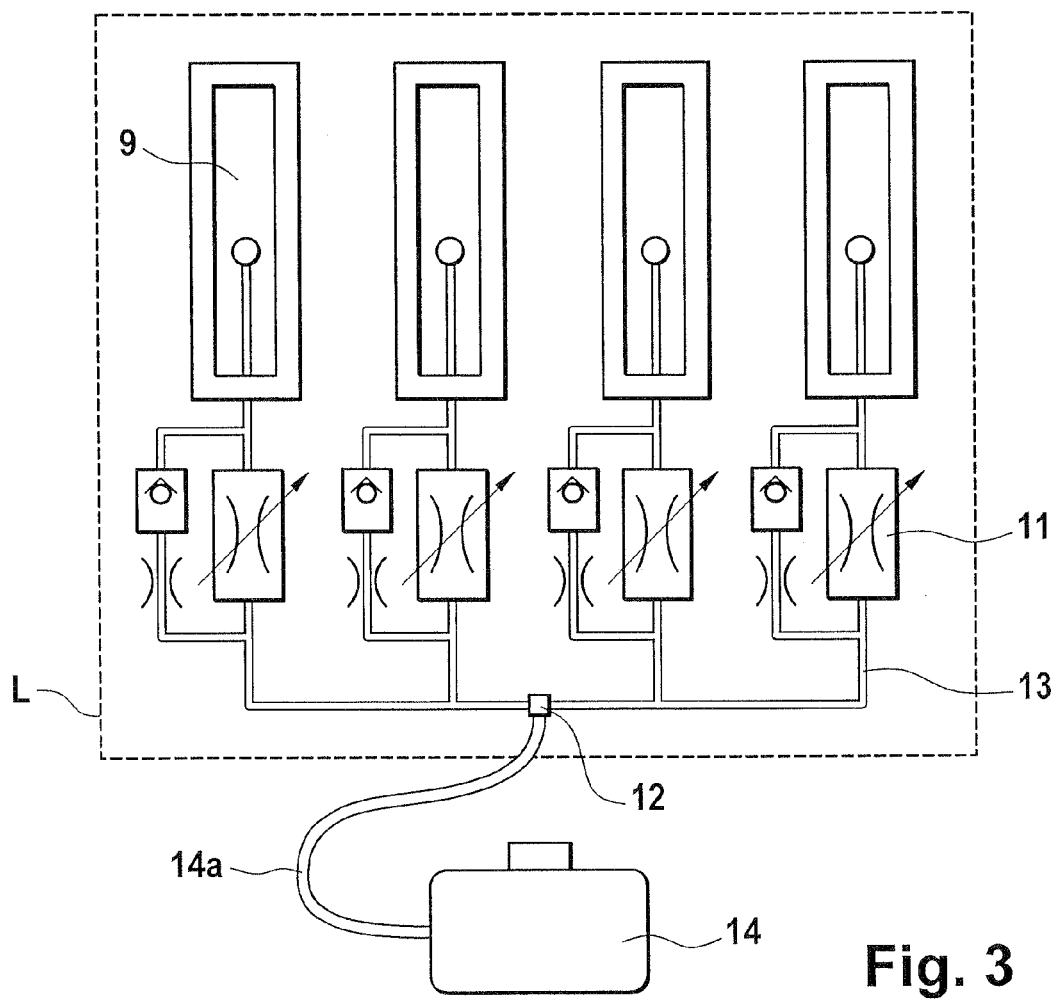
FIG. 3 shows a functional diagram of the hydrostatic profiled rail guide according to the invention.

Finally, FIG. 3 shows a diagrammatic illustration of the connection of the pressure pockets 9 and the flow control valves 11. Here, the system limit of the guide carriage is indicated by way of a dashed line L. Furthermore, this figure shows an external pressure source 14 which is connected to the collective connection 12 via a pressure hose 15. The parallel connection of the flow control valves 11 can be seen clearly here. Furthermore, the paths of the feed channels 13 can be also be seen clearly here, which are connected firstly to the central collective connection 12 and are connected secondly in each case to one of the flow control valves 11. Finally, the flow control valves 11 are connected to the pressure pockets 9; each flow control valve 11 is assigned precisely one pressure pocket 9.

It can be gathered, in particular, from FIG. 1 that all the flow control valves 11 are integrated within the clearance profile of the hydrostatic profiled rail guide. That means that a hydrostatic profiled rail guide according to the invention can be exchanged without problems for a profiled rail antifriction guide according to DIN 645-1. The external dimensions of profiled rail antifriction guides are defined in this cited DIN 645-1. Hydrostatic profiled rail guides according to the invention can be provided with corresponding external dimensions.

FIG. 5 shows a longitudinal section through a flow control valve 11 according to the invention. The flow control valve 11 has a cylindrical housing 15, in the housing hole 16 of which a differential pressure regulator 17 is accommodated. Said differential pressure regulator 17 ensures that hydraulic fluid which enters an inlet opening 18 of the flow control valve 11 and exits again from an outlet opening 18a of the flow control valve 11 remains constant even if the prevailing pressure at the inlet opening 18 fluctuates.

The housing 15 is provided on its outer circumference with an external thread 19 for screwing the flow control valve 11 into a housing hole (not depicted here) of a connecting component.

The differential pressure regulator 17 has a control mechanism 20 which delimits an adjustable flow cross section for controlled throughflow with hydraulic fluid. Said control mechanism 20 comprises a control piston 21 which is accommodated longitudinally displaceably in the housing hole 16. A supporting piston 22 which is likewise accommodated longitudinally displaceably in the housing hole 16 is arranged adjacently to the control piston 21 and coaxially. Said supporting piston 22 is accommodated captively in the housing 15. Tabs (not depicted here) which engage into the housing hole 16 and prevent the supporting piston 22 from falling out of the housing can be provided on the housing 15.

Furthermore, a compression coil spring 23 is arranged in the housing hole 16 coaxially with respect to the supporting piston 22 and the control piston 21. Said compression coil spring 23 is supported at one end on the supporting piston 22 and acts at the other end on the control piston 21. In the illustration according to FIG. 5, the compression coil spring 23 presses the control piston 21 in the direction of one axial end of the housing hole 16 of the housing 15. A supporting spacing for the compression coil spring 23 can be set variably between the supporting piston 22 and the control piston 21. A reduction in said supporting spacing means an increase in the prestress of the compression coil spring 23, as a result of which the control behavior of the differential pressure regulator 17 is changed.

The housing 15 is provided with a multiplicity of transverse holes 24 which are directed in a star shaped manner at the central axis of the flow control valve 11 and finally open into a central collective hole 25. Said collective hole 25 is adjoined by the control piston 21 with a regulating hole 26.

The housing 15 is configured as a setting part 15a for adjusting the control behavior of the differential pressure regulator 17, which will be explained in greater detail in the following text. In order to set the differential pressure regulator 17, the housing 15 is provided, at its end which is depicted at the bottom in FIG. 5, with an operating section 27 which is configured in the present case as a hexagon socket for a hexagon key to engage into.

FIG. 6 shows the flow control valve 11, screwed into the head piece 10 of the guide carriage 1. The head piece 10 is provided with a threaded hole 28 for receiving the flow control valve 11, into which threaded hole 28 the housing 15 is screwed with its external thread 19. A shoulder 29 is formed on the head piece 10 at the end of the threaded hole 28, the supporting piston 22 being provided with a stop 32 for bearing against the shoulder 29. The threaded hole 28 is connected to an annular channel 30, through which hydraulic fluid can flow into the transverse holes 24.

In the following text, the method of operation of the flow control valve according to the invention will be explained in greater detail. If pressurized hydraulic fluid presses against the regulating hole 26 via the transverse hole 24 and the collective hole 25, the hydraulic fluid flows through the control piston 21 and flows through the control mechanism 20, and finally passes to the outlet opening 18a. During the pressure increase in the hydraulic fluid at the inlet opening18, the control piston 21 lifts up in the collective hole 25 under the pressure of the hydraulic fluid counter to the spring force of the compression coil spring 23 and moves in the direction of the supporting piston 22 which is supported on the shoulder 29 in a fixed manner on the frame. As a result of this displacement of the control piston 21, a flow cross section of the control mechanism 20 is reduced by advancing of a control edge 31 of the control piston 21. This reduction in the flow cross section results in a reduction In the pressure difference between the inlet opening 18 and the outlet opening 18a, with the result that the control piston 21 tends to move toward the lower end of the housing hole 16 again under the action of the compression coil spring 23. This reverse movement of the control piston 21 in turn results in an increase in the flow cross section of the control mechanism 20. In order to change the control behavior of the differential pressure regulator 17, it is sufficient to act by way of a tool on the operating section 27 which is freely accessible from the outside and to rotate the setting part 15a, In order to change the supporting spacing between the supporting piston and the control piston.

Flow control valves 11 according to the invention can be screwed in a simple way into threaded holes which are provided on the system side, no further devices being required on the system side, in order to make it possible to set the control behavior of the flow control valves according to the invention. As a result of the flow control valve according to the invention which is configured as a screw in component, setting of the control behavior of the differential pressure regulator 17 can be performed at the same time as screwing into the housing hole.

LIST OF DESIGNATIONS

1 Guide carriage
2 Guide rail
3 Center face
4 Through opening
5 Upper bearing face
6 Lower bearing face
7 Upper bearing face
8 Lower bearing face
9 Pressure pocket
10 Head piece
10a Carrying element
11 Flow control valves
12 Collective connection
13 Feed channel
14 Pressure source
15 Housing
15a Setting part
16 Housing hole
17 Differential pressure regulator
18 Inlet opening
18a Outlet opening
19 External thread
20 Control mechanism
21 Control piston
22 Supporting piston
23 Compression coil spring
24 Transverse hole
25 Collective hole
26 Regulating hole
27 Operating section
28 Threaded hole
29 Shoulder
30 Annular channel
31 Control edge
32 Stop

The invention claimed is:

1. A hydrostatic profiled rail guide, comprising:
   a guide carriage, which is mounted hydrostatically on a guide rail and is provided, on sides which face the guide rail, with a plurality of pressure pockets for loading with hydrostatic fluid; and
   a flow control valve provided for a hydraulic line and for each of the pressure pockets, the flow control valve has an outlet opening for hydraulic fluid, an inlet opening for hydraulic fluid, a differential pressure regulator for the pressure independent provision of a constant volumetric flow of the hydraulic fluid, and a setting part for setting the control behavior of the differential pressure regulator,
   wherein the setting part has an operating section which is provided so as to be accessible from outside the guide carriage for setting the setting part, and
   wherein the setting part has external threads for screwing into a threaded hole of the guide carriage, and a screwed depth of the setting part in the threaded hole determines the control behavior of the differential pressure regulator and a portion of the setting part extending from the guide carriage so as to externally indicate a position of the setting part.

2. The hydrostatic profiled rail guide as claimed in claim 1, wherein the setting part is a housing, in which the differential pressure regulator is accommodated.

3. The hydrostatic profiled rail guide as claimed in claim 1, wherein the differential pressure regulator has a control mechanism which has a control piston which is arranged such that the control piston can be moved with respect to the setting part and which delimits an adjustable flow cross section together with an opening which is provided on the setting part for controlled throughflow with hydraulic fluid.

4. The hydrostatic profiled rail guide as claimed in claim 3, wherein a control piston of the control mechanism is accommodated longitudinally displaceably in a housing hole of the setting part which is configured as a housing, the control piston delimiting with a control edge, together with at least one opening which penetrates the housing, an adjustable flow cross section for controlled throughflow with hydraulic fluid.

5. The hydrostatic profiled rail guide as claimed in claim 4, wherein a supporting piston is accommodated longitudinally displaceably in the housing hole, a spring which is supported at one end on the supporting piston acting at the other end on the control piston, it being possible to set a supporting spacing for the spring between the supporting piston and the control piston.

6. The hydrostatic profiled rail guide as claimed in claim 5, wherein the supporting spacing can be produced by displacing the housing with respect to the supporting piston which is supported in a fixed manner on the frame.

7. The hydrostatic profiled rail guide as claimed in claim 6, wherein the control piston is provided with a regulating hole for the passage of hydraulic fluid.

8. The hydrostatic profiled rail guide as claimed in claim 6, wherein the supporting piston is provided with a stop for bearing against a connecting part of the hydraulic system.

9. The hydrostatic profiled rail guide as claimed in claim 1, wherein the connecting part has a threaded hole for screwing in the flow control valve, the supporting piston bearing with its stop against a part of the connecting part, which part delimits the threaded hole.

10. The hydrostatic profiled rail guide according to claim 1, wherein the guide carriage includes a carrying element having the pressure pockets, a head piece, which is arranged on an end side of the carrying element and the flow control valve.

11. The hydrostatic profiled rail guide according to claim 10, wherein the operating section is accessible from outside of the guide rail.

* * * * *